Oct. 4, 1966
H. E. GIBBONS ETAL
3,276,326
CIRCULAR HOLE CUTTER
Filed Dec. 21, 1964
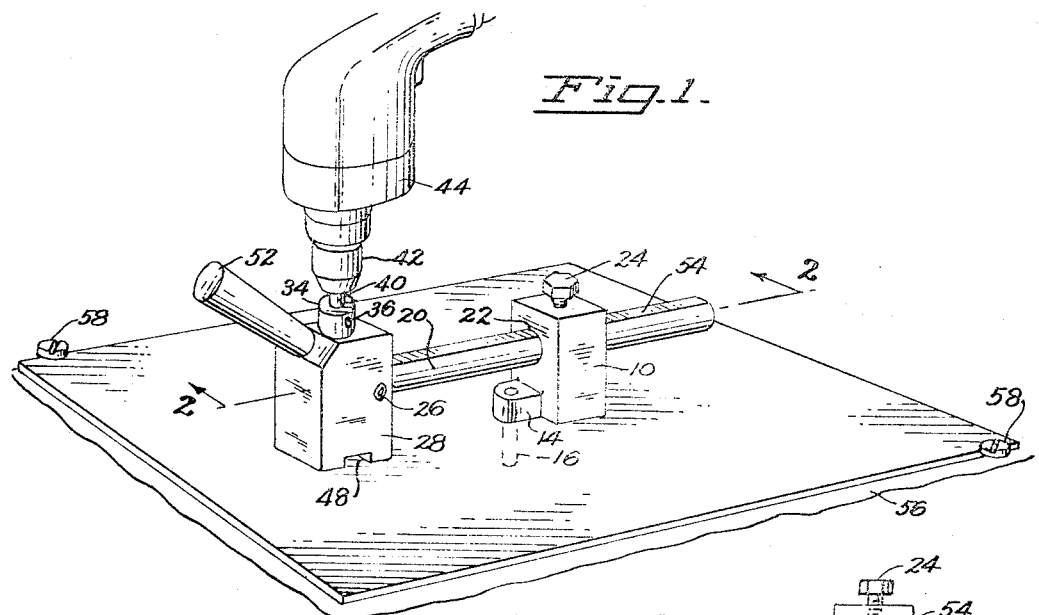
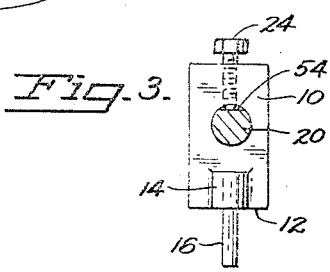
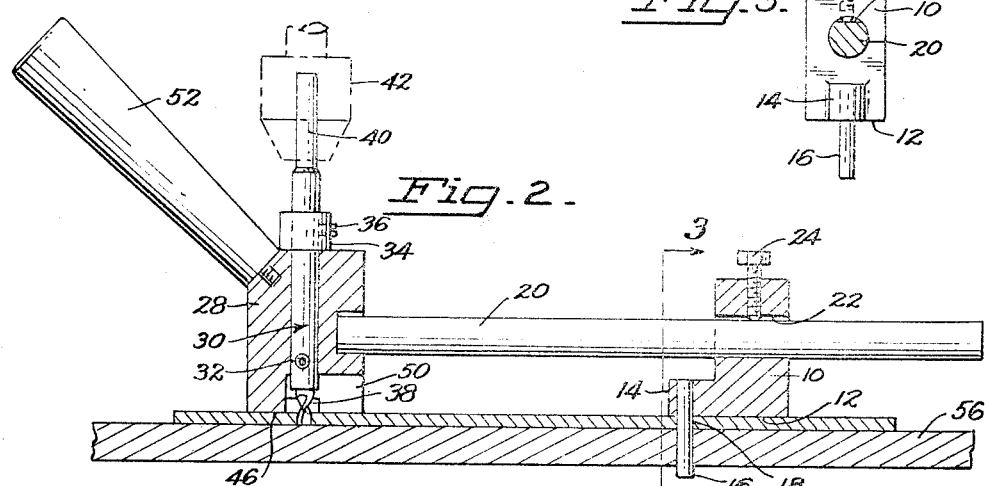
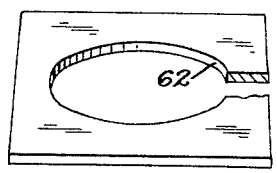
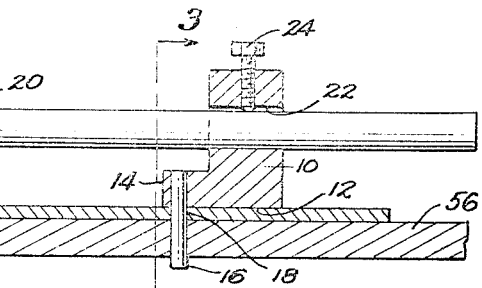
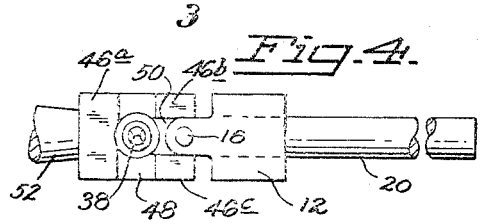
INVENTORS
HERBERT E. GIBBONS
EDWARD R. STUBBLEFIELD
BY
Rolph L. Freeland, Jr.
ATTORNEY

3,276,326
CIRCULAR HOLE CUTTER
Herbert E. Gibbons, 14442 Harvest Ave., Norwalk, Calif., and Edward R. Stubblefield, 904 W. E St., Ontario, Calif.
Filed Dec. 21, 1964, Ser. No. 419,961
12 Claims. (Cl. 90—12)

This invention pertains to the cutting of large diameter circular holes in sheet metal, wood, or plastic. Specifically, it pertains to a convenient device for cutting smooth holes up to many inches in diameter, which may be powered by an ordinary electric drill motor of the type readily available in industrial shops and in most home workshops.

Cutters somewhat similar to that of the present invention already exist, for example, that of H. Silken, described in U.S. Patent 3,124,182 issued March 10, 1964. The cutter of Silken is also powered by means of an ordinary electric motor, and comprises a pivoting trammel stud that is inserted into a pilot hole in the center of the circle to be cut, an arm that pivots about the stud, and a fitting in the rotating end of the arm that holds a special side-cutting-action bit.

The cutter comprising the present invention has advantages over the cutter of Silken. It is capable of using a standard end mill instead of the special side-cutting-action bit of Silken. The standard end mill can be readily resharpened on an emery wheel, whereas the side-cutting-action bit requires unusual sharpening machinery. Furthermore, the present invention comprises a strong, heavy lateral bearing at the moving end of its radius arm. The combined effect of the end mill cutter and this bearing is that it becomes possible to cut metal up to about one-eighth inch in thickness, whereas previous cutters could cut only wood, plastics, and very thin sheet metal.

In addition, another advantage in the present invention is that in the cutter, means are provided for preventing the accumulation of chips around the cutter which is important for producing a clean cut in the material and preventing scratches on the surfaces thereof.

Further, the present invention has the advantage of cutting not only extremely large holes of several inches, but holes of less than one inch as well as circular grooves and circular holes having compound radii where the depth of the cutting is less than the thickness of the material being cut.

Other and additional advantages and features of the present invention will become apparent to those skilled in the art from a study of the accompanying specification and drawings which form a part thereof, and wherein:

FIGURE 1 is a perspective view of the cutter constructed in accordance with the teachings of this invention as it appears in the operation of cutting a hole in sheet metal;

FIGURE 2 is an elevational view taken along line 2—2 of FIGURE 1 and looking in the direction of the arrows;

FIGURE 3 is an end view of the pivot block taken along line 3—3 of FIGURE 2 and looking in the direction of the arrows;

FIGURE 4 is a bottom view of the cutter illustrating in detail the chip clearance passageways and how the pivot block may nest or telescope within the journal block for sub-inch holes;

FIGURE 5 is a perspective view of a hole in material cut with the cutter shown in the previous figures; and FIGURE 6 is a perspective view of a hole cut with compound radii by use of the tool shown in the previous figures.

Referring simultaneously to FIGURES 1-3, inclusive, wherein identical parts have identical numbers, pivot block 10 rests on the surface of the material in which the hole is to be cut. From the base 12 of pivot block 10 projects an extension 14 coexistensive with the base 12 from which a cylindrical pivot pin 16 is inserted in a pilot hole 18 in the material to be cut. The pivot pin 16 (and the pilot hole 18) may have a diameter of one-fourth inch, for example.

Projecting out of the pivot block in a direction preferably perpendicular to the axis of the pivot pin 16, and therefore parallel to the plane surface of material to be cut, is a radius rod 20, which can slide back and forth through an aperture 22 in pivot block 10, except when fixed in one position by locking bolt 24. Radius rod 20 may be calibrated with markings to indicate the size of hole for which the cutter is set.

Fastened to the end of radius rod 20 in any suitable manner such as by set screw 26 is journal block 28 which is the main body at the rotating end of the cutter. Through journal block 28 perpendicular to the surface of the material to be cut passes a cylindrical cutter holder 30 capable of holding securely a standard end mill 38 with the aid of set screw 32. At the upper end of cutter holder 30 is a collar 34 that can be positioned by a set screw 36 wherever desired on the upper extension of cutter holder 30. The position of collar 34 with respect to the journal block 28 on cutter holder 30 determines the depth to which end mill 38 penetrates into the material being cut.

The upper extremity of the body of cutter holder 30 is a spindle 40 sized to fit into a conventional hand drill motor chuck 42. The drill motor 44 most frequently encountered is the so-called quarter-inch size, and so the diameter of spindle 40 of most probable use is one-quarter inch.

We have found the configuration at the bottom of the journal block to be important to the successful action of the cutter. The bearing surface 46 lies in a plane perpendicular to the axis of the cutter holder. As shown in FIGURE 4, bearing surface 46 is divided into three parts, 46a, 46b, and 46c which form therebetween chip clearance passageways 48 and 50 to prevent the accumulation of chips around the cutter.

The importance of the prevention of the accumulation of chips around the cutter is explained as follows. While operating the present invention, if it is desired to produce a "clean" cut, leaving the surrounding area unscratched, it is important to exert a moderate downward force on the journal block, perpendicular to the surface plane of the material being cut, to ensure that metal chips do not get under the bearing surface 46 and scratch the surface of the material while journal block 28 is moved along on that surface.

If the tool is always to be used for cutting holes and never for cutting discs; that is, if the part outside the cut circle is always the part to be saved, and the part inside the cut circle is never to be saved, then it is advantageous to grind off the part of the bearing surface labeled 46a so that it no longer contacts the material being cut. The surface 46a may be raised enough so that the space under it acts as an additional chip clearance passageway, and so that there is no possibility of chips being caught between surface 46a and the surface of the material being cut.

Although the cutter of the present invention is operable without it, we have found it highly advantageous to add handle 52 projecting outward from journal block 28 in the general direction opposite from the direction toward pivot 16, such as for example, at an angle to the journal block and upwardly toward the drill motor. Although the force necessary to hold journal block 28 against the material being cut can be exerted by the hand holding the drill motor handle, and the force necessary to revolve journal block 28 around pivot 16 can be exerted by the other hand of the operator, it is convenient to supplement the downward force by pressing downward on handle 52 and it is much easier to produce the overall rotation about pivot 16 by pulling, or pushing, in the horizontal direction with handle 52.

In the light of the above description, it should be evident that there is no necessary upper limit to the size of the holes that may be cut with the present invention. The radius rod 20 does not have to be specially made, and it does not have to be calibrated nor provided as with a flat such as 54 for the locking bolt 24 indicated in FIGURE 2. The pivot block 10 and the journal block 28 can be bored to fit a standard rod, which may be many feet long so that the radius of the hole to be cut is by no means restricted to the several inches indicated in FIGURES 1 and 2.

As hereinbefore mentioned, it is possible also to produce holes of sub-inch diameters. In FIGURES 1–4, it can be seen that sideward extension 14 from which pivot pin 16 projects downward, can be made to slip into, i.e., telescope into chip clearance passageway 50 as a tenon slips into a mortise, thereby making the axes of the pivot pin 16 and the cutting end mill 38 approach each other very closely. In the practical embodiment of this cutter, an axis approach distance of less than three-eighths inch was made possible, so that it became feasible to produce a hole three-fourths inch in diameter. Thus, the hole cutter of this invention can therefore easily bridge the size range from very large holes down to the sizes that are readily made in wood with ordinary wood bits, and in sheet metal with the so-called chassis punches.

While the mortise and tenon arrangement is shown as the preferred method of bringing the pivot pin close to the mill cutter, it is within the scope of the teachings of this invention to provide the pivot pin 16 eccentrically located on the bottom of the pivot block 10, that is, adjacent the edge of the pivot block near the journal block so that the journal block and pivot block could be brought into contacting relationship with one another. This, of course, would not permit as small a hole to be cut as would the mortise and tenon arrangement, but it would be satisfactory for many purposes.

Now that all parts of the present invention have been mentioned, the overall operation may be summarized for clarity as follows: The material to be cut is preferably placed on a surface such as 56 and clamped by any suitable means such as screws 58. The pilot hole 18 is then drilled in the material to be cut, and the pivot pin 16 is inserted into that pilot hole. The radius rod 20 is slid through pivot block 10 until the axis of the end mill 38 is at the desired radius from the pivot. The radius is fixed by tightening locking bolt 24.

To attach a hand drill motor 44 to spindle 40, it is most convenient to remove the cutter holder 30 and insert spindle 40 into the drill motor chuck 42 just as one would usually insert an ordinary drill. The hand drill motor 44 is then lifted over journal block 28 and the cutter holder 30 containing the end mill 38 is reinserted into journal block. At this point in the operation, if the material to be cut is sheet metal, some cutting oil may be advantageously applied to that material at least in the region under the journal block. The drill motor is then turned on and the cutting end of the tool 38 is pushed vertically into the material to be cut. Then journal block 28 is moved slowly around the desired circle by means of handle 52 (or if handle 52 is absent, by exerting horizontal force directly on journal block 28). One hand is needed to move the cutter; the other hand is used to stabilize the drill motor. With the cutter used in this manner, a circular hole such as shown in FIGURE 5 may be cut. It is to be noted that the very edge 62 of the hole is clean and its edge is preferably squared with respect to the top surface of the material cut.

We have found, for instance, that with a 5/32 inch standard end mill in the described tool, powered by a conventional one-fourth inch hand drill motor going 1700 r.p.m., we can cut aluminum one-eighth inch thick at a circumferential rate of 8 inches per minute.

As hereinbefore mentioned, the invention is useful for cutting shapes other than simple holes. Because the cutting element 38 is a standard end mill and the penetration depth can be regulated, the invention can also be used to cut circular grooves of square cross-section, and of depth less than the thickness of the material being cut. For instance, a circular groove one-quarter inch deep may be cut in a piece of aluminum one-half inch thick. It is also possible to cut circular holes of compound radii. For instance, it is possible to cut a hole having a cut-through radius of 2 inches and a surrounding 5/32 inch rabbet through half the thickness of the material. This is illustrated in FIGURE 6 where the cut-through radius is indicated at 64 and the surrounding rabbet is shown at 66. It will be appreciated that such a hole will receive and support a cap closure that has a small radius of 2 inches and a large radius of 25/32 inches. The shoulder formed by the large radius will fit into the 5/32 inch rabbet of the hole. As a matter of great convenience, both the rabbeted hole and the cap with its complementary rabbet may be readily cut with the described invention.

As hereinabove mentioned, the collar adjusts the projection of the cutting tool from the bearing surface 46 to conveniently permit the cutting tool to rabbet and cut through the material to provide the compound radii.

Obviously, the projection of the cutting tool from the bearing surface as adjusted by the collar will permit the cutter to cut deeper sheet material than heretofore accomplished by presently available cutting tools since it will allow the tool to cut first at one depth and then at other depths in the same cut groove. For example, one-eighth inch aluminum may be cut with one pass at the metal whereas one-quarter inch aluminum will require two passes and the adjustability of this invention permits such a cutting. With this invention, it is also possible to cut other sheet material such as steel by cutting a groove in increments into the depth of the material ultimately cutting through to form a hole, as above described.

Finally, while the cutting tool is shown as square to cut a groove of square cross-section, obviously an end mill having a beveled end could be used to form holes having tapered edges, if desired.

While only a single embodiment of the present invention is disclosed and described herein, it will be readily apparent to persons skilled in the art that numerous changes and modfications may be made without departing from the scope of the invention. Accordingly, the foregoing disclosure and description thereof are for illustrative purposes only and do not in any way limit the invention which is defined only by the claims which follow.

What is claimed is:

1. A circle cutter for use with a powered hand drill, comprising:
   pivot means,
   a journal block,
   a radius rod between said pivot means and journal block and adjustably connected so that the distance between said pivot means and journal block can be selected,
   a cutter holder journaled in said journal block capable of fastenably, coaxially, holding a standard end mill,
   means for controlling the position of said cutter holder in said journal block, and thereby in turn simultaneously controlling the penetrating depth of said end mill into the material being cut,
   means for connecting a conventional hand drill motor chuck to said cutter holder,
   a bearing surface on said journal block capable of engaging the surface of said material being cut, and means for preventing the accumulation of chips around the cutter and for preventing scratching of the surface of the material being cut by chips between said bearing surface and the surface of said material being cut.

2. The circle cutter as claimed in claim 1, further including:
  a handle attached to and projecting outward from said journal block, at least a component of the projection being in a direction opposite from the direction toward said pivot.

3. The circle cutter claimed in claim 1, further including:
  means for receiving part of said pivot means within said journal block to bring said pivot in close proximity to said cutter mill for cutting small holes in the material.

4. A circle cutter for use with a powered hand drill, comprising:
  pivot means,
  a journal block,
  a radius rod between said pivot means and journal block and adjustably connected so that the distance between said pivot means and journal block can be selected,
  a cutter holder journaled in said journal block capable of fastenably, coaxially, holding a standard end mill,
  means controlling the position of said cutter holder in said journal block, and thereby in turn simultaneously controlling the penetrating depth of said end mill into the material being cut,
  means for connecting a conventional hand drill motor chuck to said cutter holder,
  a bearing surface at the bottom of said journal block, capable of sliding on the plane surface of said material being cut, said bearing surface being perpendicular to said cutter holder axis, and
  means for preventing the accumulation of chips around the cutter, and for preventing scratching of the surface of the material being cut by chips between said bearing surface and the surface of said material being cut.

5. The cutter claimed in claim 4, further including:
  a handle attached to and projecting outward from said journal block, at least a component of the projection being in a direction opposite from the direction toward said pivot.

6. The circle cutter claimed in claim 4, further including:
  means for receiving part of said pivot means within said journal block to bring said pivot in close proximity to said cutter mill for cutting small holes in the material.

7. A circle cutter for use with a powered hand drill, comprising:
  pivot means,
  a journal block,
  a radius rod between said pivot means and journal block and adjustably connected so that the distance between said pivot means and journal block can be selected,
  a cutter holder journaled in said journal block capable of fastenably, coaxially, holding a standard end mill,
  an adjustable collar surrounding said cutter holder controlling the position of said cutter holder in said journal block, and thereby in turn simultaneously controlling the penetrating depth of said end mill into the material being cut,
  a spindle coaxial with, and terminating said cutter holder outside said journal block, said spindle being sized to fit into a conventional hand drill motor chuck,
  a bearing surface at the bottom of said journal block, capable of sliding on the plane surface of said material being cut, said bearing surface being perpendicular to said cutter holder axis, and
  means defining a chip clearance passageway in said bearing surface, to prevent the accumulation of chips around the cutter, and to prevent scratching of the surface of the material being cut by chips between said bearing surface and the surface of said material being cut.

8. The cutter claimed in claim 7, further including:
  a handle attached to and projecting outward from said journal block, at least a component of the projection being in a direction opposite from the direction toward said pivot.

9. A cutter as claimed in claim 7, further including:
  means for telescoping the pivot means into the passageway to bring said pivot means into close proximity with the cutter for cutting small holes in the material.

10. A circle cutter for use with a powered hand drill, comprising:
  a pivot block from which projects a cylindrical pivot,
  a radius rod passing slidably and fastenably through said pivot block,
  a journal block mounted on one end of said radius rod,
  a cylindrical cutter holder journaled in said journal block capable of fastenably, coaxially, holding a standard end mill,
  an adjustable collar surrounding said cutter holder controlling the position of said cutter holder in said journal block, and thereby in turn simultaneously controlling the penetrating depth of said end mill into the material being cut,
  a spindle coaxial with, and terminating said cutter holder outside said journal block, said spindle being sized to fit into a conventional hand drill motor chuck,
  a bearing surface at the bottom of said journal block capable of sliding on the plane surface of said material being cut, said bearing surface being perpendicular to said cutter holder axis, and
  a chip clearance passageway in said bearing surface, to prevent the accumulation of chips around the cutter, and to prevent scratching of the surface of the material being cut by chips between said bearing surface and the surface of said material being cut.

11. The cutter claimed in claim 10, further including:
  a handle attached to and projecting outward from said journal block, at least a component of the projection being in a direction opposite from the direction toward said pivot.

12. A cutter as claimed in claim 10, further including:
  means for telescoping the cylindrical pivot means into the passageway to bring said cylindrical pivot means into close proximity with the cutter for cutting small holes in the material.

References Cited by the Examiner
UNITED STATES PATENTS
3,124,182  3/1964  Silken _____ 145—121

FOREIGN PATENTS
806,951  6/1951  Germany.
830,624  2/1952  Germany.

References Cited by the Applicant
UNITED STATES PATENTS
2,146,458  2/1939  Willard et al.
2,696,134  11/1954  Mole.
2,986,814  6/1961  Brinkman.

WILLIAM FELDMAN, *Primary Examiner.*

R. V. PARKER, JR., *Assistant Examiner.*